(12) United States Patent
Chang

(10) Patent No.: US 7,641,845 B2
(45) Date of Patent: *Jan. 5, 2010

(54) METHOD FOR MANUFACTURING A FOIL DECORATED MOLDING

(75) Inventor: Chun-Yuan Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,348

(22) Filed: Dec. 14, 2007

(65) Prior Publication Data
US 2008/0251973 A1 Oct. 16, 2008

(30) Foreign Application Priority Data
Apr. 12, 2007 (CN) .................. 2007 1 0200451

(51) Int. Cl.
*B29C 51/10* (2006.01)
*B29C 45/14* (2006.01)

(52) U.S. Cl. .............. 264/511; 264/547; 264/553; 264/513; 264/516; 264/267; 264/275; 264/250; 264/255

(58) Field of Classification Search ............... None
See application file for complete search history.

(56) References Cited

U.S. PATENT DOCUMENTS 6,251,333 B1 * 6/2001 Zheng et al. ............. 264/513
6,475,423 B1 * 11/2002 Masterson et al. ......... 264/511

FOREIGN PATENT DOCUMENTS

| JP | 2004034505 | * | 2/2004 |
| JP | 2004050736 | * | 2/2004 |
| JP | 2004050736 A | | 2/2004 |

* cited by examiner

*Primary Examiner*—Edmund H. Lee
(74) *Attorney, Agent, or Firm*—Frank R. Niranjan

(57) ABSTRACT

A method for manufacturing a foil decorated molding includes steps of: providing an injection molding device, the injection molding device comprising a male mold and a female mold, the male mold having a projecting part, the female mold defining a cavity; transporting the foil into the injection molding device and between the male and female molds; locking the foil to the female mold to form an airproof space together with the cavity of the female; vacuuming the airproof space to suck the foil toward the female mold; clamping the male and female molds to form a molding space; inputting thermal medium into the molding space to press the foil to cling to an inner surface of the cavity of the female mold; injecting molten resin into the molding space; and cooling and opening the injection molding device, the molten resin cooled forming a molding.

12 Claims, 8 Drawing Sheets

METHOD FOR MANUFACTURING A FOIL DECORATED MOLDING

Relevant subject matter is disclosed in the co-pending U.S. patent application Ser. No. 11/956,345, still pending, and entitled "INJECTION MOLDING DEVICE;" application Ser. No. 11/956,347, still pending, and entitled "METHOD FOR ELONGATING A FOIL;" application Ser. No. 11/956,349, still pending, and entitled "VALVE DEVICE OF INJECTION MOLDING DEVICE;" application Ser. No. 11/956,350, still pending, and entitled "INJECTION MOLDING DEVICE"), which are filed on the same date Dec. 14, 2007.

BACKGROUND

1. Field of the Invention

The present invention relates to a method for manufacturing a foil decorated molding.

2. Description of Related Art

Conventionally, various kinds of methods for manufacturing a foil decorated molding, which is molded by an injection molding process and has a transfer layer removed from a substrate foil of a transfer foil and placed on the surface of the molding after the transfer foil is inserted into cavities in an injection mold, have been known in the art. Since the use of the method requires an alignment of the transfer foil along a cavity-forming face of the mold, the transfer foil is preheated before the injection molding process so as to be easily aligned along the cavity-forming face of the mold where the cavity-forming face thereof is greatly recessed or projected from a parting face of the mold.

A traditional injection molding method includes transferring a heater between the male mold and the female mold to heat the foil before matching the molds, and removing the heater after the foil is heated. However, because of the need for the heater and the space it occupies, cost and volume of the injection mold is increased.

What is needed is to provide an effective method for manufacturing a foil decorated molding.

SUMMARY

In one embodiment, a method for manufacturing a foil decorated molding includes steps of: providing an injection molding device, the injection molding device comprising a male mold and a female mold, the male mold having a projecting part protruding toward the female mold, the female mold defining a cavity corresponding to the projecting part; transporting the foil into the injection molding device and between the male and female molds; locking the foil to the female mold to form an airproof space together with the cavity of the female mold; vacuuming the airproof space to suck the foil toward the female mold; clamping the male and female molds to form a molding space surrounded by the foil in the cavity of the female mold, projecting part, and parts around the projecting part of the male mold; inputting thermal medium into the molding space to press the foil to cling to an inner surface of the cavity of the female mold; injecting molten resin into the molding space; and cooling and opening the injection molding device, the molten resin cooled forming a foil decorated molding.

Other advantages and novel features of the present invention will become more apparent from the following detailed description of an embodiment when taken in conjunction with the accompanying drawings, in which:

DETAILED DESCRIPTION

Figure 1:
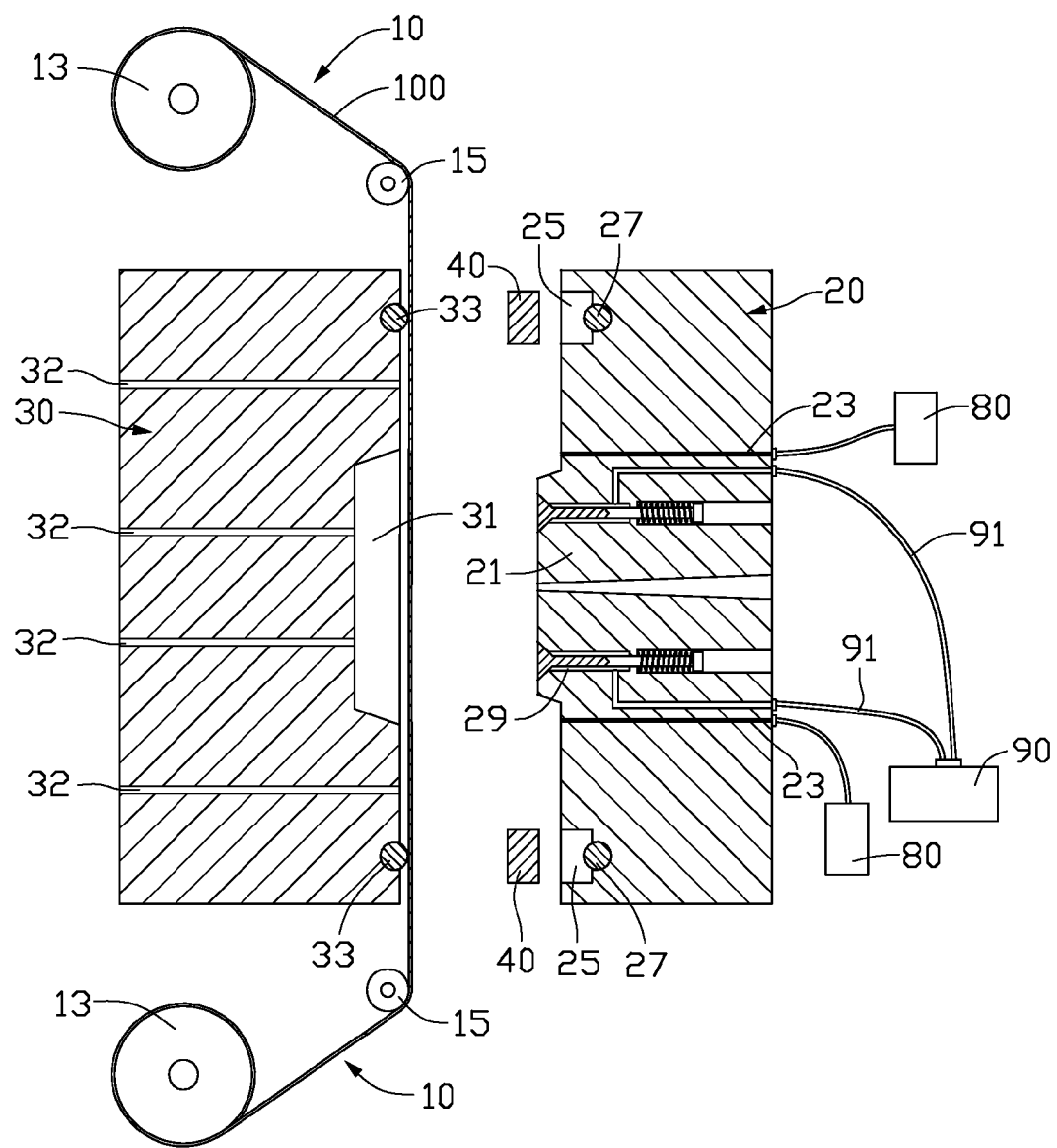
FIG. 1 is a cross-sectional view of an injection molding device actualizing a method for manufacturing a foil decorated molding in accordance with an embodiment of the present invention, the injection molding device including a male mold and a female mold.

Referring to FIG. 1, an injection molding device actualizing a method for manufacturing a foil decorated molding in accordance with an embodiment of the present invention is provided. The injection molding device includes a transport 10, a mold including a male mold 20 and a female mold 30, a plurality of pressing members 40, and a thermal medium source 90.

The male mold 20 forms a projecting part 21 protruding toward the female mold 30. A plurality of air discharge holes 23 is defined in the male mold 20 around the projecting part 21 and extending from a side, facing the female mold 30, of the male mold 20 to an opposite side of the male mold 20. A pressure release valve 80 is connected to each air discharge hole 23. The pressure release valve 80 is adjustable according to need during molding. A plurality of receiving slots 25 is defined in the male mold 20 in vicinity of edges of the male mold 20. A plurality of hermetic rings 27 is received in the corresponding receiving slots 25.

Figure 2:
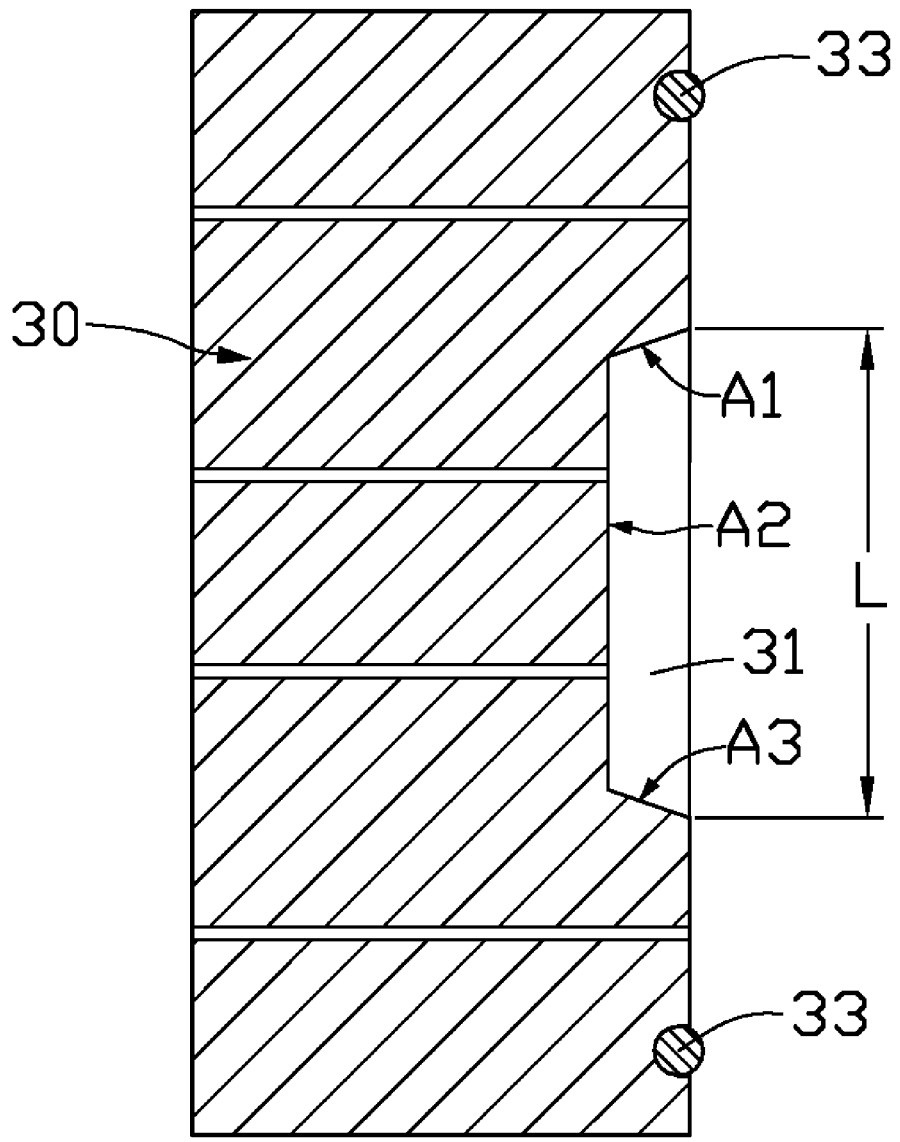
FIG. 2 is a cross-sectional view of the female mold of FIG. 1.

Referring to FIG. 2, the female mold 30 defines a cavity 31 therein. The cavity 31 includes a bottom surface A3, a first side surface A1 extending from an edge of the bottom surface A3 and a second side surface A2 extending from an opposite edge of the bottom surface A3 to a surface that faces the male mold 20, with an opening formed on the corresponding surface of the female mold 30. A length of the opening of the cavity 31 is L. A plurality of air discharge holes 32 is defined in the male mold 20 and extending from a side, facing the male mold 20, of the female mold 30 to an opposite side of the female mold 30. At least two of the air discharge holes 32 extend from the bottom surface A3 of the cavity 31 to the corresponding side of the female mold 30 opposite to the male mold 20. Each air discharge hole 32 is connected to a vacuum pump at the side of the female mold 30 opposite to the male mold 20. A plurality of hermetic rings 33 is attached to the female mold 30 adjacent to an edge of the female mold 30.

Figure 3:
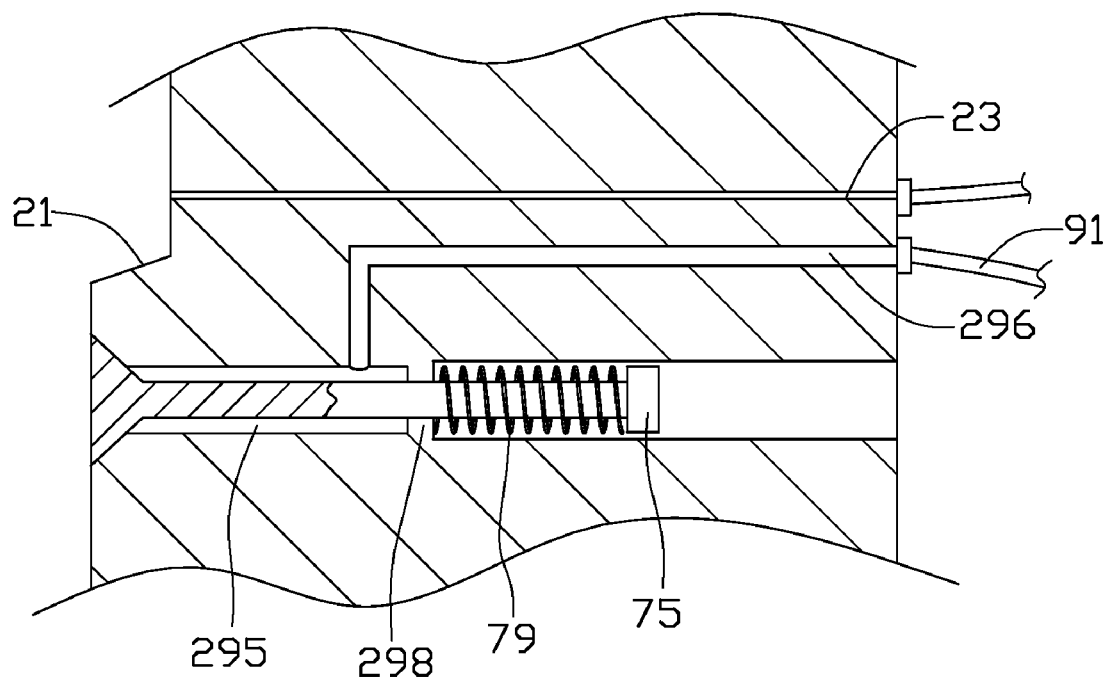
FIGS. 3 and 4 are enlarged, partially cutaway views of the male mold of FIG. 1, showing two using states respectively.
Figure 4:
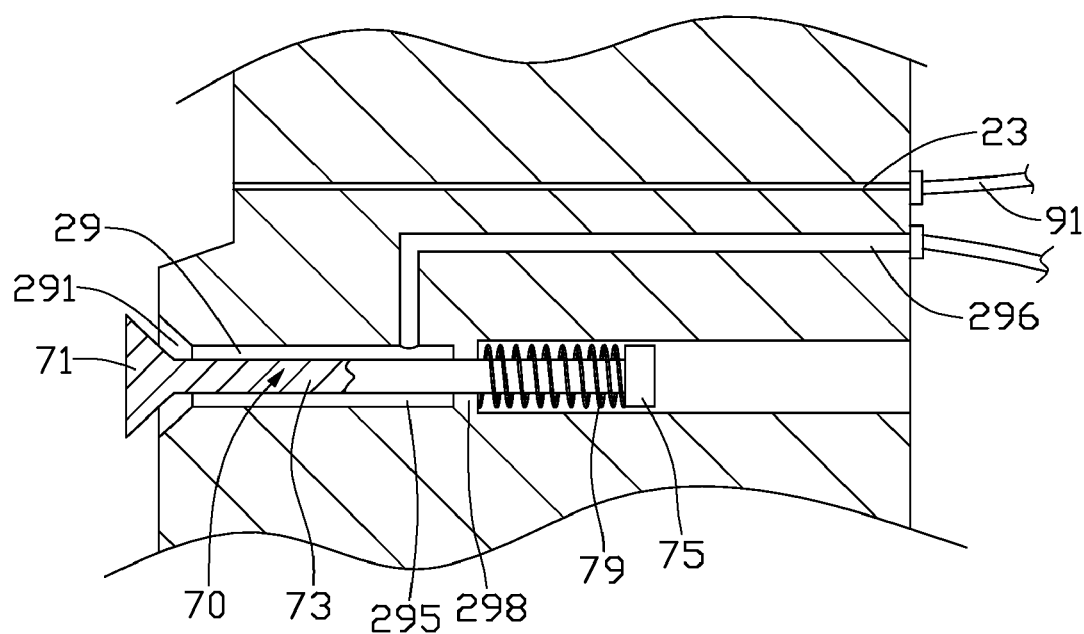

Referring also to FIGS. 3 and 4, the male mold 20 defines a plurality of channels 29 therein extending from a side, facing the female mold 30, of the projecting part 21 to a side of the male mold 20 opposite to the female mold 30. Each channel 29 includes a bell-mouthed recessed portion 291 defined in the projecting part 21 with a large end thereof in the surface facing the female mold 30, of the projecting part 21, a conduit 295 defined in the male mold 20 communicating with a small end of the recessed portion 291, and an L-shaped slender duct 296 with one end communicating with the conduit 295 and the other end passing through the surface opposite to the female mold 30, of the male mold 20. A block 298 protrudes in from one end opposite to the recessed portion 291, of the conduit 295. One end of each of a plurality of pipes 91 is connected to the end opposite to the female mold 30, of each slender duct 296 respectively, and the other end of each of the plurality of pipes 91 is connected to the thermal medium source 90. A through hole is defined in the block 298.

A plug 70 is attached in each channel 29. The plug 70 includes a taper-shaped obturating portion 71 for obturating the recessed portion 291 of the channel 29, and a pole 73 extending from a small end of the obturating portion 71. The pole 73 extends through the through hole of the block 298. A fastening member 75 is fixed to a distal end of the pole 73. A resilient member 79, such as a spring, fits about the pole 73 and is resiliently located between the block 298 and the fastening member 75.

The thermal medium source 90 has thermal medium contained therein, such as thermal liquid or high-pressure gas. In this embodiment, the thermal medium is high-pressure gas. The thermal medium is capable of being heated by an electric heater or an infrared ray heater (IR heater).

The transport 10 includes two transporting rollers 13 and two guiding rollers 15 positioned at two opposite ends of the mold respectively, for transporting the foil 100 into the mold. The foil 100 includes a base layer, and a printed layer attached to the base layer and having printed patterns or characters.

Figure 5:
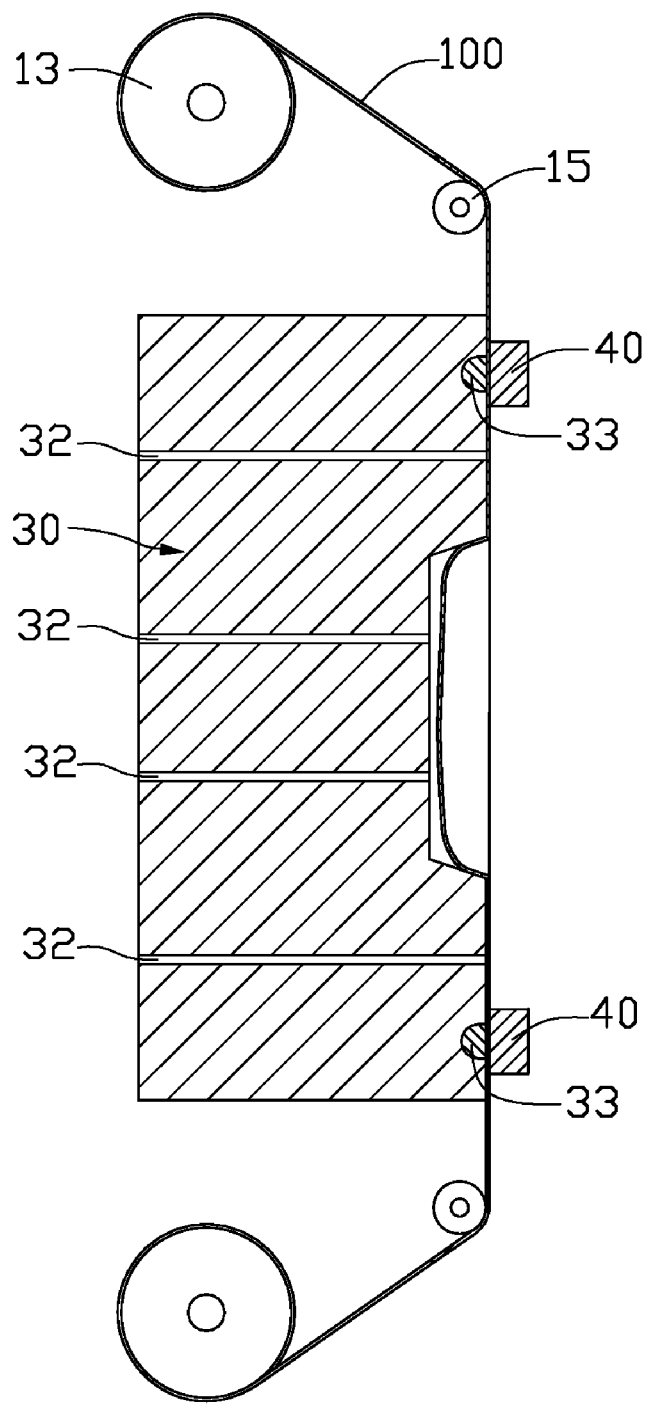
FIG. 5 is a cross-sectional view of the female mold of FIG. 1, but showing the foil extending into the cavity of the female mold.
Figure 6:
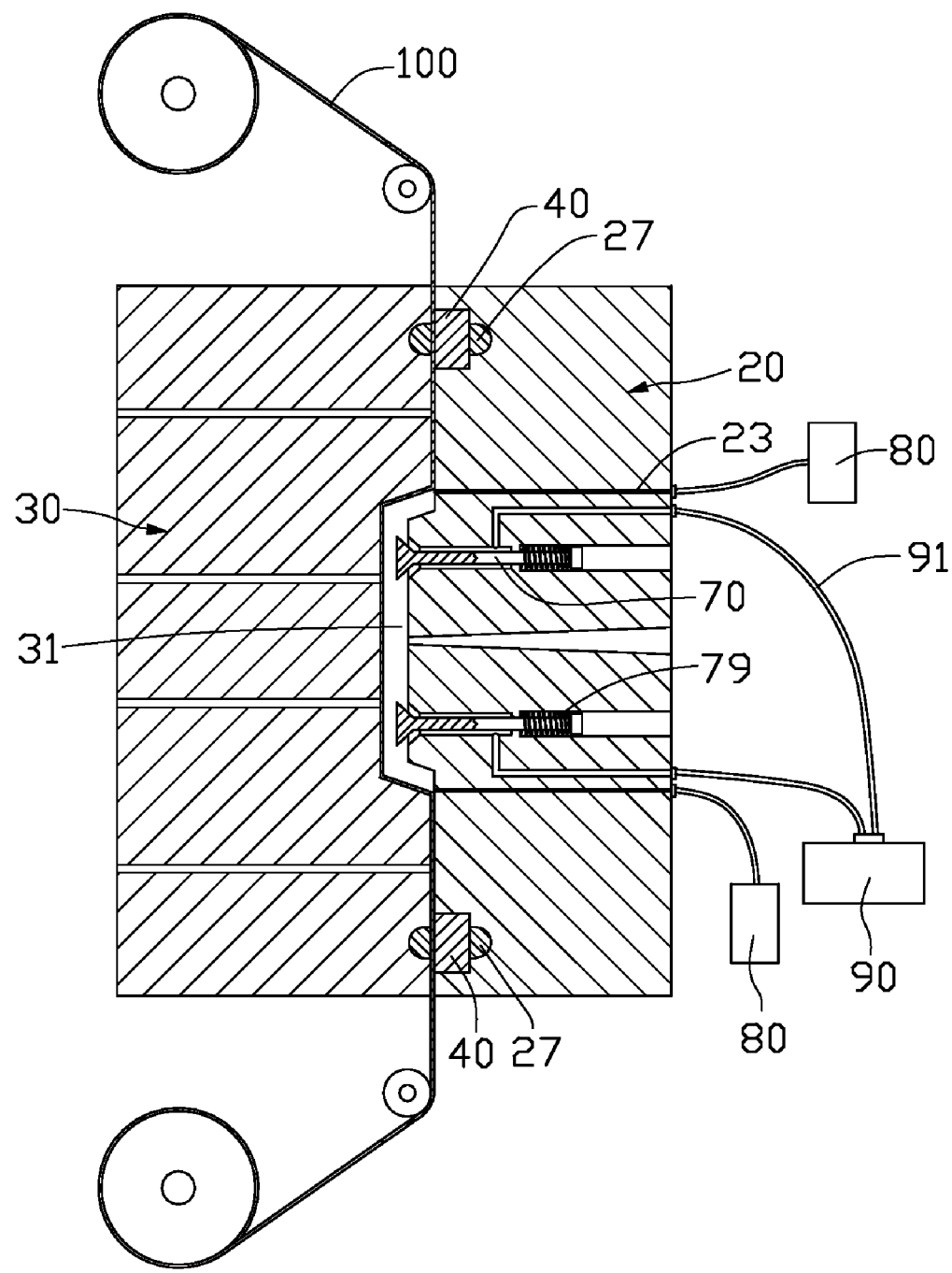
FIG. 6 is similar to FIG. 1, but showing the foil extending along an inner surface of the cavity of the female mold and the male and female molds matched together.
Figure 8:
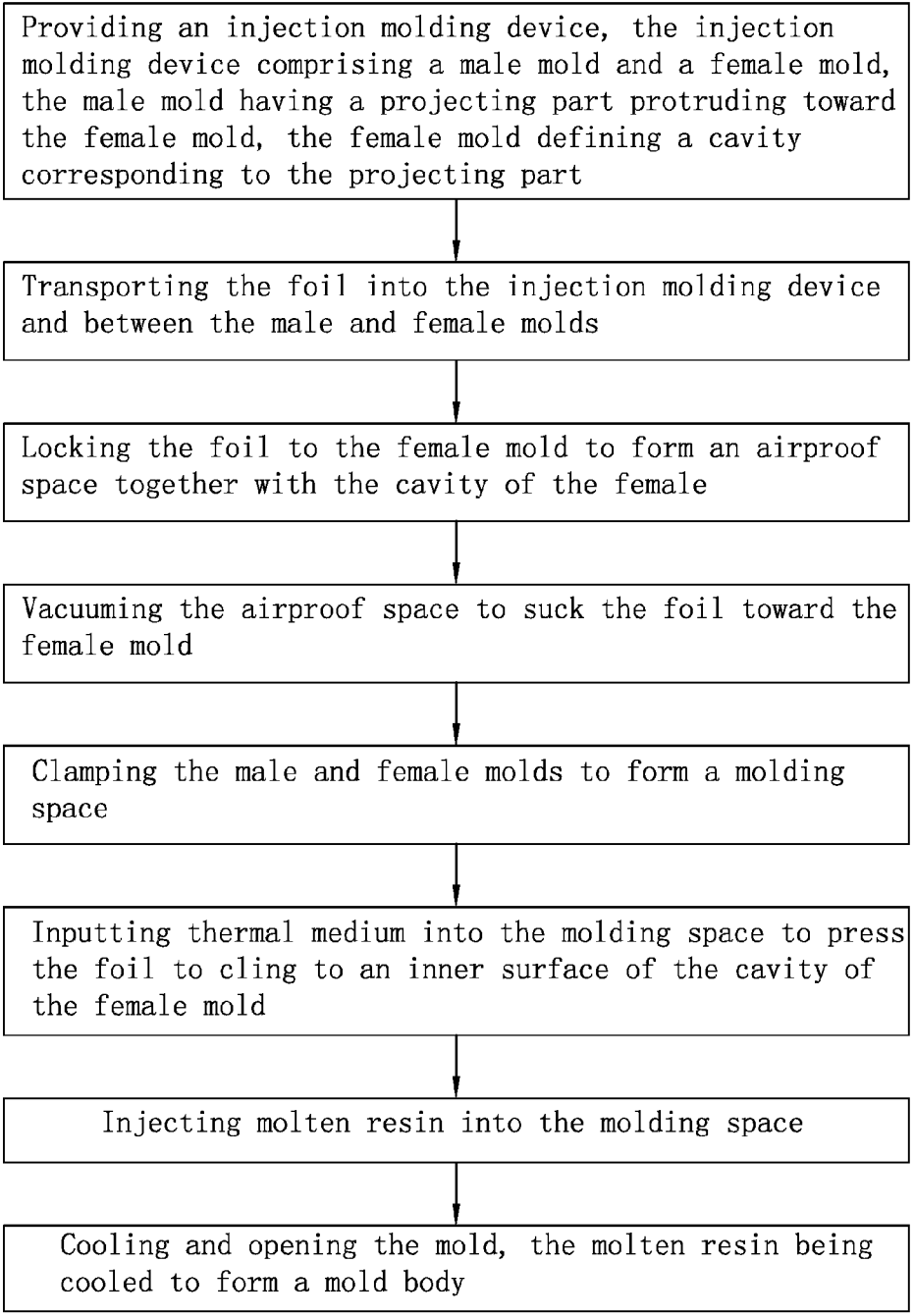
FIG. 8 is a flow chart of the method for manufacturing a foil decorated molding.

Referring also to FIG. 8, the method includes the following steps. The foil 100 is transported into the mold between the male and female molds 20, 30. The male, female molds 20, 30, and the pressing members 40 are clamped together to form a molding space among an inner surface of the cavity 31 of the female mold 30, the projecting portion 21 of the male mold 20, and parts around the projecting portion 21. The pressing members 40 are received in the corresponding receiving slots 25 of the male mold 20, and press the corresponding hermetic rings 27, 33 to airproof the molding space. The molding space is separated into a first airproof space adjacent to the female mold 30 and a second airproof space adjacent to the male mold 20 by the foil 100. The vacuum pump is connected to the air discharge holes 32 of the female mold 30 to vacuumize the first airproof space, thus the foil 100 is sucked toward the first airproof space, as shown in FIG. 5. The pressure release valve 80 is shut, and the value of the pressure release valve 80 is predetermined according to the molding condition. The thermal medium source 90 inputs heated gas to the channels 29 via the pipes 91. The plugs 70 are driven by the heated gas to move toward the female mold 30, therefore the channels 29 open. The heated gas is blown into the second airproof space to press the foil 100 to cling to the inner surface of the cavity 31 of the female mold 30. The foil 100 is intenerated by the heated gas to cling to the inner surface of the cavity 31 easily, as shown in FIG. 6.

Figure 7:
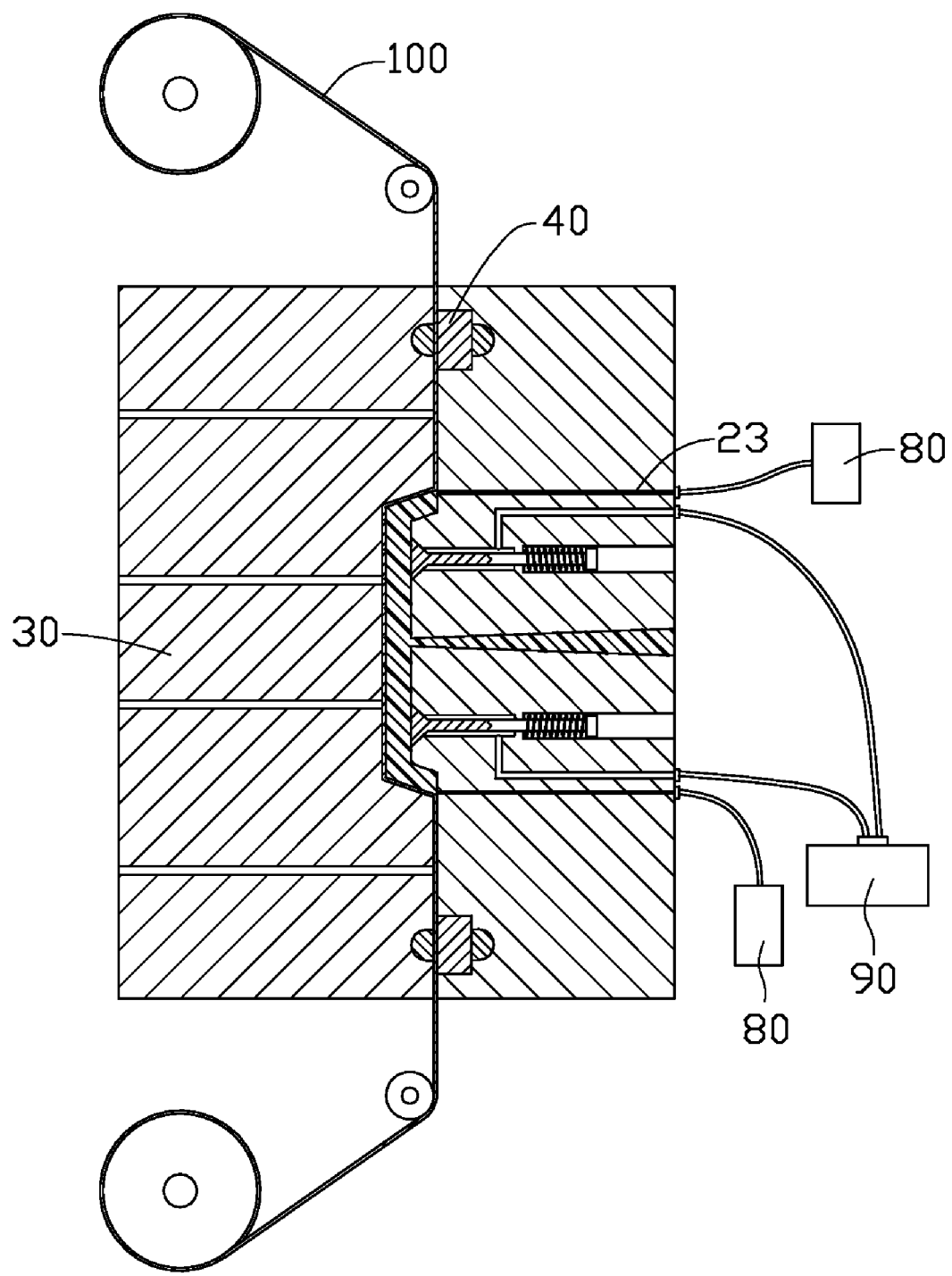
FIG. 7 is similar to FIG. 6, but showing an after injection state.

Referring also to FIG. 7, molten resin is injected through an injection opening defined in the male mold 20 into the molding space. The molten resin presses the plugs 70 into the corresponding channels 29 against resistance of the corresponding resilient members 79. The heated gas in the second airproof space is released via the air discharge holes 23 of the male mold 20 when the pressure in the molding space is greater than the predetermined value of the pressure release valve 80. The molten resin is cooled to form a molding. The mold is opened, with the male mold 20 being separated from the female mold 30. The base layer of the foil 100 is released from the mold body, leaving the printed layer of the foil 100 attached to a surface of the molding.

In this embodiment, the injection molding device is used for elongating the foil 100 between the male and female molds 20, 30 by exhausting air from the cavity 31 via the air discharge holes 32 of the female mold 30 and pressurizing the foil 100 via the heated gas. For example, a length of the first side surface A1 is a1, a length of the second side surface A2 is a2, and a length of the bottom surface A3 is a3, when the first, second, and bottom surface A1, A2, A3 of the cavity 31 and the length L accord with an expression a1+a2+a3>=(1+20%)*L, the foil 100 is capable of being elongated for suiting the cavity 31 of the female mold 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a foil decorated molding, comprising steps of:
   providing an injection molding device, the injection molding device comprising a male mold and a female mold, the male mold having a projecting part protruding toward the female mold, the female mold defining a cavity corresponding to the projecting part, a channel defined in the male mold, a plug resiliently attached and movable in the channel for obturating the recessed portion of the channel and is capable of opening or closing the channel automatically;
   transporting the foil into the injection molding device and between the male and female molds;
   locking the foil to the female mold to form an airproof space together with the cavity of the female;
   vacuuming the airproof space to suck the foil toward the female mold;
   clamping the male and female molds to form a molding space surround by the foil in the cavity of the female mold, projecting part and parts around the projecting part of the male mold;
   inputting thermal medium into the molding space through the channel to press the foil to cling to an inner surface of the cavity of the female mold;
   injecting molten resin into the molding space; and
   cooling and opening the injection molding device, the molten resin cooled forming a molding.

2. The method as claimed in claim 1, wherein the channel extends from a side, facing the inner surface of the cavity of the female mold, of the projecting part of the male mold to a side, opposite to the projecting part, of the male mold.

3. The method as claimed in claim 2, wherein the thermal medium is capable of driving the plug to open the channel.

4. The method as claimed in claim 2, wherein the thermal medium is produced by a heater connected to the channels.

5. The method as claimed in claim 4, wherein the heater is an electric heater or an infrared ray heater.

6. The method as claimed in claim 1, wherein the thermal medium is heated gas, an air discharge hole is defined in the male mold for releasing the heated gas from the male mold.

7. The method as claimed in claim 6, wherein a pressure release valve is connected to the air discharge hole for maintaining a predetermined pressure in the mold.

8. The method as claimed in claim 1, wherein a vacuum pump is connected to the female mold to vacuumize the first airproof space.

9. The method as claimed in claim 1, further comprising releasing a base layer of the foil from the molding, a printed layer of the foil being attached to a surface of the molding.

10. The method as claimed in claim 1, wherein the channel comprises a bell-mouthed recessed portion defined in the projecting part with a large end thereof facing the female mold, the plug comprises a taper-shaped obturating portion for obturating the recessed portion of the channel to open or close the channel.

11. The method as claimed in claim 10, wherein the plug further comprises a pole extending from a small end of the obturating portion, a block protrudes into the channel from one end opposite to the recessed portion, a through hole is defined in the block, the pole extends through the through hole of the block, a fastening member is fixed to a distal end of the pole, a resilient member fits about the pole and is resiliently located between the block and the fastening member.

12. The method as claimed in claim 10, wherein the thermal medium is capable of striking against the taper-shaped obturating portion to drive the obturating portion of the plug to move toward the female mold away from the recessed portion of the channel.

* * * * *